March 2, 1943.  W. L. POLLARD  2,312,849
TRANSMISSION
Filed Sept. 11, 1940  3 Sheets-Sheet 1
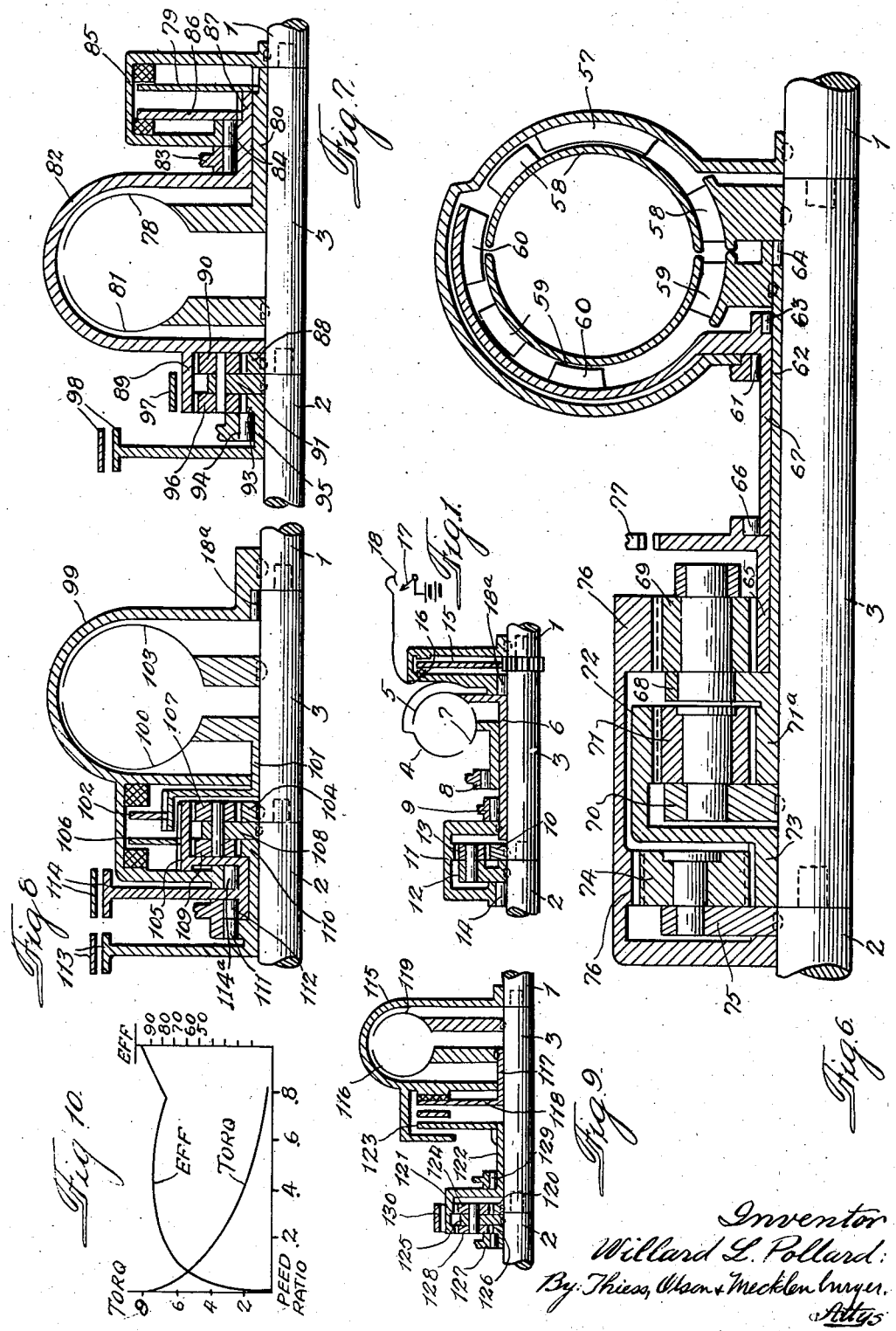

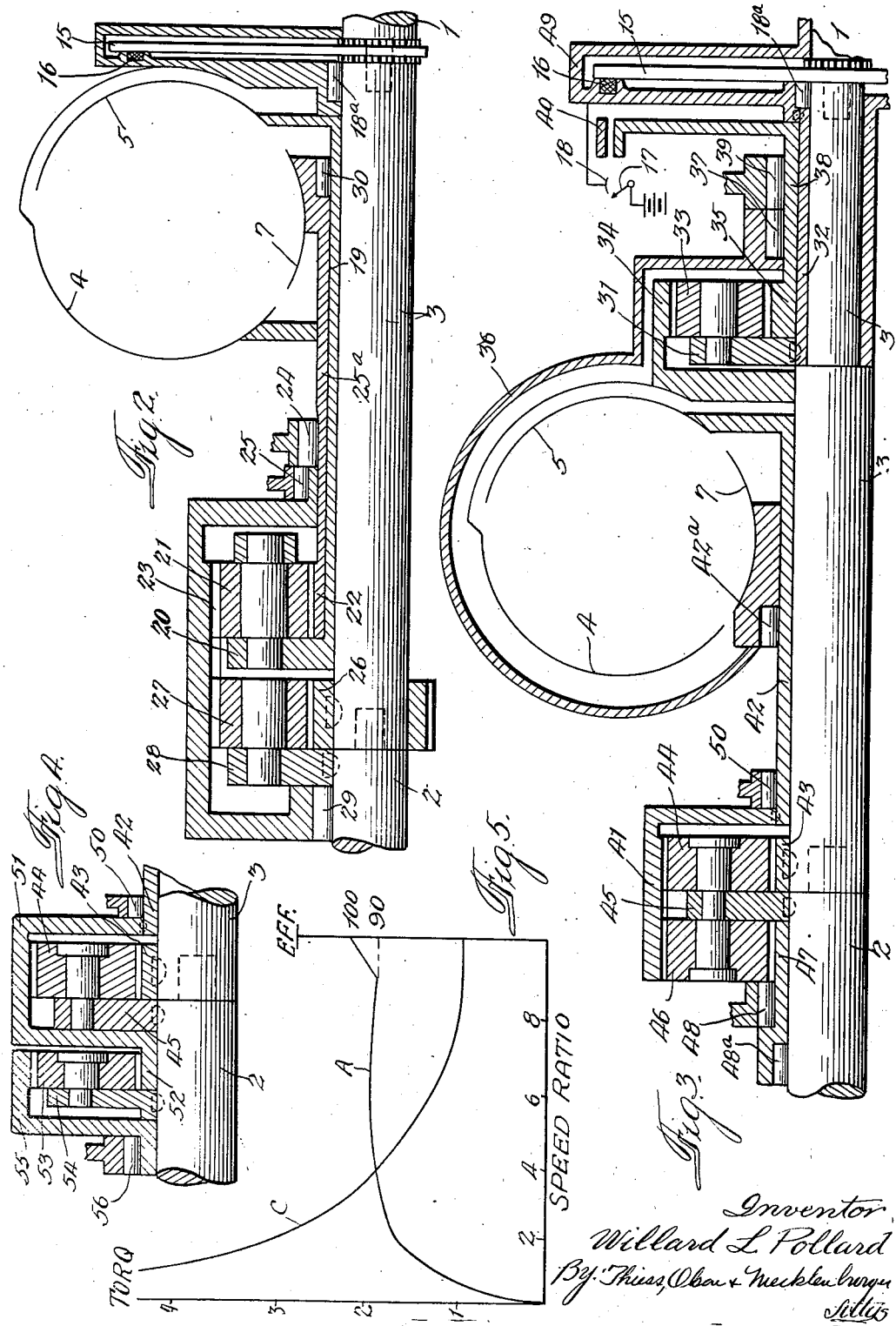

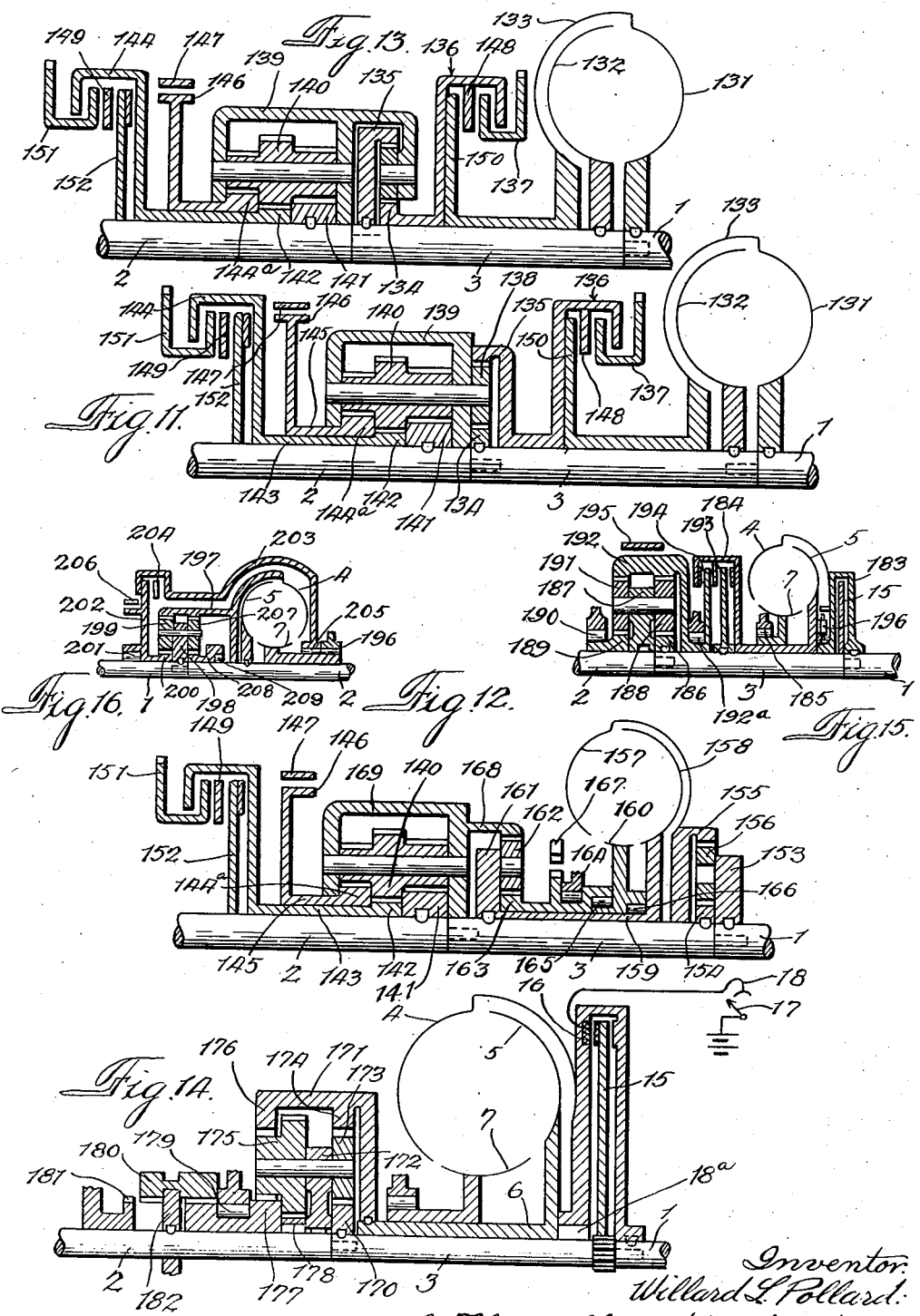

Patented Mar. 2, 1943

2,312,849

UNITED STATES PATENT OFFICE 2,312,849

TRANSMISSION

Willard L. Pollard, Evanston, Ill.

Application September 11, 1940, Serial No. 356,255

15 Claims. (Cl. 74—189.5)

My invention relates to variable speed transmissions.

One of the objects of my invention is to provide a variable speed transmission including a hydraulic torque converter which will have a relatively high efficiency over a substantial speed ratio change.

A further object is to provide such a construction which will embody an over-drive.

A further object is to provide such a construction which will embody an under-drive.

A further object is to provide an improved variable speed transmission having a two-path power flow, one of which includes a fluid drive.

Further objects will appear from the description and claims.

In the drawings, in which several forms of my invention are shown,

Fig. 1 is an axial sectional view showing a hydraulic converter combined with a planetary transmission.

Fig. 2 is an axial sectional view showing another form.

Fig. 3 is an axial sectional view showing another form.

Fig. 4 is an axial sectional view showing another form.

Fig. 5 is a view showing efficiency and torque course plotted against speed ratio.

Fig. 6 is an axial sectional view showing another form of hydraulic converter combined with a planetary transmission.

Fig. 7 is an axial sectional view showing a hydraulic coupler combined with the planetary transmission.

Fig. 8 is an axial sectional view showing another form of hydraulic coupler combined with a planetary transmission.

Fig. 9 is an axial sectional view showing another form of combined coupler and planetary.

Fig. 10 is a view showing efficiency and torque curves plotted against speed ratio which might be obtained from the form shown in Fig. 6.

Fig. 11 is an axial section of a turbo-coupler planetary transmission.

Fig. 12 is an axial section showing a fluid torque converter planetary transmission.

Fig. 13 is an axial section showing another form of transmission.

Fig. 14 is an axial section showing another form.

Fig. 15 is an axial section showing another form.

Fig. 16 is an axial section showing another form.

Referring first to Fig. 1, the construction shown therein comprises a drive shaft 1 which may be driven from an automobile motor, a driven shaft 2 which may be connected with the rear end transmission, an intermediate shaft 3 in axial alignment with the driving and driven shaft, a hydraulic torque converter comprising a pump rotor 4 connected to rotate with the drive shaft 1, a turbine rotor 5 rotatable with a sleeve 6 surrounding the intermediate shaft 3, a vaned reactance stato-rotor 7 having a one-way anchorage device 8 to prevent reverse rotation, a one-way anchorage device 9 to prevent reverse rotation of the sleeve 6, a planetary gear construction comprising a sun gear 10 keyed to the intermediate shaft 3, a ring gear 11 keyed to the sleeve 6, a gear carrier 12 keyed to the driven shaft 2, planet gearing 13 carried by the gear carrier and meshing with the sun gear 10 and ring gear 11, and a one-way clutch 14 by means of which under certain conditions the ring gear 11 may drive the driven shaft 2. A suitable clutch is provided by means of which under certain conditions the intermediate shaft may be connected to rotate with the motor shaft. This clutch may comprise a clutch disc 15 splined on the intermediate shaft 3 and operated by the coil 16 of an electric clutch which is energized when the speedometer pointer controlled by the driven shaft makes contact with the contact 18 connected with the electric clutch.

A one-way clutch 18a is provided to prevent the sun gear 10 from over-running the pump 4.

In operation with the car standing still the electric clutch will be de-energized, thus eliminating the sun gear 10 as a driving member and the initial drive will be from the turbine rotor 5 through the sleeve 6 and one-way clutch 14 to the driven shaft. When the propeller shaft speed causes the speedometer pointer 17 to move to engage the contact 18 and energize the clutch coil 16 the intermediate shaft 3 will be connected to rotate with the motor shaft 1 and there will be a divided power flow between the motor shaft 1 and the propeller shaft 2, one path being through the intermediate shaft 3 and sun gear 10 to the planet gearing 13, and the other path being through the hydraulic torque converter and ring gear 11 to the planet pinions 13.

If at the time of change from pure hydraulic converter action to divided flow action the torque drag on the ring gear 11 is so great that the torque pull of the turbine rotor cannot cause the ring gear 11 to advance, the ring gear will back up until it rests against the one-way anchor 9, whereupon the drive will be entirely through the sun gear 10 to the cage 12, as the ring gear 11 will be held against rotation by the one-way anchorage device 9.

If, however, the torque drag on the ring gear 11 is not so great as to cause it to lean back on the one-way anchorage device, the ring gear 11 will pick up in speed until the reaction of the stato-rotor 7 becomes zero after which the stato-rotor will start to rotate and the hydraulic torque converter will act as a hydraulic coupling.

In the construction shown in Fig. 2, the motor shaft 1, propeller shaft 2, intermediate shaft 3, pump rotor 4, turbine rotor 5, stato-rotor 7, one-way clutch 18a and electric clutch members 15 and 16 may be substantially the same as in the form just described. In this form, however, the turbine sleeve 19 is secured to a planet gear carrier 20 which carries planet pinions 21 meshing with the sun gear 22 and ring gear 23. The sun gear 22 and ring gear 23 are both held against reverse rotation by means of one-way anchors 24 and 25 respectively. Sun gear 22 and stato-rotor 7 are mounted on a sleeve 25a surrounding the sleeve 19.

The intermediate shaft 3 is keyed to a sun gear 26 which meshes with planet pinions 27 carried by the gear carrier 28 keyed to the propeller shaft 2. These planet pinions 27 also mesh with the ring gear 23. The ring gear is provided with a one-way clutch 29 by means of which it may under certain conditions drive the propeller shaft.

In use, with the propeller shaft 2 standing still, the clutch 15 will be disconnected and the sun gear 26 will be eliminated as a drive factor. Under these conditions the drive will be through the turbine rotor 5, tubular shaft 19, gear carrier 20, planet pinions 21, ring gear 23, and one-way clutch 29 to the driven shaft 2. The sun gear 22 and stato-rotor 7 will be held against reverse rotation by the one-way anchor 24 acting on the sleeve 25a of the stato-rotor, the stato-rotor and sun gear 22 being held against forward rotation by the reverse reaction on the stator blades.

A one-way clutch 30 is provided to prevent the stato-rotor 7 from over-running the turbine sleeve 19.

When the propeller shaft has reached such a speed that the electric clutch 16 is energized to cause the sun gear 26 to rotate with the motor shaft 1, this may result either in a divided power flow operation or in an elimination of the torque converter action with a drive through the sun gear 26 and planet pinions 27 to the cage 28 keyed to the propeller shaft 2. If the drag on the propeller shaft is so small that the torque converter continues to function, one path of the power flow will be through the converter to the turbine rotor 5, tubular shaft 19, planet pinion carrier 20, planet pinions 21, and ring gear 23 to the planet pinions 27 on the propeller shaft cage 28. The other path will be from the clutch plate 15 to the intermediate shaft 3 and sun gear 26 to the planet pinions 27.

If, however, the torque drag on the propeller shaft is so great that the fluid torque converter cannot continue to function, the ring gear 23 will slow up until it comes to rest against the one-way anchor 25 after which the drive will be solely through the sun gear 26 and planet pinions 27 to the propeller shaft cage 28. In this form as well as in the form shown in Fig. 1, a one-way clutch 18a may be provided to prevent the sun gear from over-running the motor shaft in going downhill or the like.

In this form the sun gear 22 is connected with the stato-rotor 7 in such a way as to advance the time of change-over from torque conversion to coupling action of the converter. For this purpose the sun gear 22 is mounted on the sleeve 25a of the stato-rotor 7 so that the action of the planet pinions 21 on the sun gear 22 will exert a force tending to rotate the stato-rotor 7 in a forward direction thus acting to overcome the reverse reaction on the stato-rotor due to the torque converter action.

The construction shown in Fig. 3 comprises the motor shaft 1, the intermediate shaft 3, the propeller shaft 2, the pump rotor 4, the turbine rotor 5, the stato-rotor 7 and the clutch and clutch control 15, 16, 17 and 18, which may be substantially the same as in the forms previously described. In this form, however, an overdrive is provided between the motor shaft 1 and the pump rotor 4 comprising a gear carrier 31 keyed to the tubular shaft 32 which rotates with the motor shaft 1, planet pinions 33 mounted on this gear carrier 31, a ring gear 34 secured to rotate with the pump rotor 4 and a sun gear 35 meshing with the planet pinions 33. This sun gear 35 is connected with the stato-rotor 7 in such a way as to urge it in a forward direction of rotation by means of a tubular housing 36 surrounding the pump rotor 4 and secured to the stato-rotor 7 and having a one-way clutch connection 37 with the sleeve 38 of the sun gear 35 which prevents the sun gear 35 from over-running the tubular housing 36 and stato-rotor 7. A one-way anchorage device 39 is provided to prevent reverse rotation of the sun gear 35. A brake 40 is provided for holding the sun gear 35 against rotation when desired to effect over-drive.

At the rear end of the transmission a ring gear 41 is provided keyed to the tubular shaft 42 on which the turbine rotor 5 is mounted. A one-way clutch 42a may be provided to prevent the stato-rotor from over-running the turbine rotor 5. A sun gear 43 is secured to the intermediate shaft 3 on which the clutch plate 15 is splined, this sun gear meshing with planet pinions 44 mounted on a gear carrier 45 secured to the driven shaft 2 and meshing with the ring gear 41.

Another set of planet pinions 46 are mounted on the gear carrier 45, these pinions meshing with the ring gear 41 and also meshing with the sun gear 47 surrounding the propeller shaft 2 and held against reverse rotation by means of a one-way anchor 48.

When the propeller shaft speed is too low to energize the electric clutch coil 16 the sun gear 43 will be eliminated as part of the drive and the power flow from the motor shaft will be through the clutch housing 49, tubular shaft 32, gear carrier 31, planet pinions 33, ring gear 34, pump rotor 4, stato-rotor 7, turbine rotor 5, tubular shaft 42, ring gear 41, planet pinions 46 and cage 45 to the propeller shaft 2, the sun gear 47 being held against reverse rotation by the one-way anchor 48. A one-way clutch 48a may be provided to prevent the sun gear 47 from over-running the shaft 2 in coasting.

When the propeller shaft speed becomes great enough to energize the electric clutch coil 16 the sun gear 43 will begin to rotate. If the propeller shaft drag is too great to be overcome by the turbine pull, the ring gear 41 will slow down until it rests against the one-way anchor 50, thus eliminating the torque converter action, the drive then being entirely through the sun gear 43 and planet pinions 44 to the propeller shaft cage 45. If, however, the propeller shaft drag is not so great as to eliminate the torque converter action, there will be a divided power flow, part being as above described through the sun gear 43 and the other part being through the planet gear 33, ring gear 34, pump rotor 4, stato-rotor 7, turbine rotor 5, and ring gear 41.

When the reverse fluid reaction on the stato-rotor 7 becomes less than the forward action exerted on the stop-rotor by the sun gear 35, through the one-way clutch 37, and housing 36, the stato-rotor will begin to rotate, and the fluid torque converter will then act as a fluid coupling.

To effect overdrive the brake 40 is applied to hold the sun gear 35 against rotation thus effecting an overdrive of the fluid coupling, and the consequent overdrive of the ring gear 41.

In the construction shown in Fig. 4, the parts to the right of the tubular shaft 42 and the intermediate shaft are the same as in Fig. 3.

The sun gear 43, planet pinions 44, propeller shaft 2, and cage 45, also may be the same as shown in Fig. 3. In this form, however, a ring gear 51 is secured to the tubular shaft 42 and to a sun gear 52 surrounding the propeller shaft 2, and meshing with planet pinions 53 secured to another gear carrier 54 keyed to the propeller shaft 2. A ring gear 55 is provided meshing with the planet pinions 53 and provided with a one-way anchor 56 to prevent reverse rotation.

In this form with the propeller shaft initially stationary and the clutch 15 released, the sun gear 43 will be eliminated as a power path and power will be transmitted solely from the tubular shaft 42 through the ring gear 51, sun gear 52, planet pinions 53, and gear carrier 54 keyed to the propeller shaft 2, the ring gear 55 being held against reverse rotation by the one-way anchor 56. This will give a very low drive.

As the propeller shaft picks up speed the electric clutch coil 16 will be energized and the sun gear 43 will begin to rotate. If the drag on the propeller shaft is so great as to eliminate the torque converter action, the drive will be solely through the sun gear 43, planet pinions 44 and propeller shaft cage 45, the ring gear 51 being held against reverse rotation by the one-way anchor 50. If, however, the drag on the propeller shaft 2 is not so great as to eliminate the torque converter action, there will be a divided power flow, one path being from the sun gear, as indicated above, and the other being through the torque converter to the tubular shaft 42 and ring gear 51. Overdrive may be effected just as in the form previously described.

With the forms of my invention shown in Figs. 3 and 4, in which a divided power flow path and an advance in time of the change from torque converter action to coupling action are provided, curves substantially as shown in Fig. 5 may be obtained in which the divided power flow path enables an overall efficiency of more than 90% to be obtained for the major portion of the speed ratio range, and in which the torque multiplication may in the form shown in Fig. 4, for example, rise as high as 8:1.

Fig. 6 shows a turbo-planetary transmission in which a plurality of turbines are provided, each turbine connected with a portion of a planetary transmission. The construction here shown comprises a drive shaft 1, a driven shaft 2, an intermediate shaft 3, a turbo-planetary transmission comprising a pump rotor 57 keyed to the drive shaft 1, a primary turbine 58 keyed to the intermediate shaft 3, a secondary turbine 59 keyed to a sleeve, and a stato-rotor 60 held against reverse rotation by the one-way anchor 61 and held against over-running the sleeve 62 of the turbine 59 by a one-way clutch 63, a one-way clutch 64 to prevent the secondary turbine 59 from over-running the intermediate shaft 3, a sun gear 65 having a one-way clutch connection 66 with the sleeve 67 of the stato-rotor 60 to prevent the sun gear 65 from over-running the stato-rotor, a gear carrier 68, rotatable with the sleeve 62 of the secondary turbine, planet gearing 69 meshing with the sun gear 65, a gear carrier 70 on which the planet gearing 71 is mounted keyed to the intermediate shaft 3, a sun gear 71a rotatable with the gear carrier 68 and meshing with the planet gearing 71, a ring gear 72 meshing with the planet gearing 71, a sun gear 73 rotatable with the ring gear 72, planet gearing 74 meshing with the sun gear 73, and a gear carrier 75 on which the planet gearing 74 is mounted, keyed to the driven shaft 2, the planet gearing 69 and 74 meshing with the duplex ring gear 76.

A clutch 77 may be provided for holding the sun gear 65 against rotation to secure overdrive of the ring gear 76 and enable the stato-rotor 60 to rotate freely with the turbines and pump.

In this form, with the vehicle initially stationary, the first drive will be from the primary turbine 58 through the intermediate shaft 3, gear carrier 70, planet gearing 71, ring gear 72, sun gear 73, planet gearing 74, and gear carrier 75 to the driven shaft 2. During this stage the secondary turbine 59 and stato-rotor 60 are stationary, acting as vaned reaction members, the reaction torque on the vanes of the secondary turbine 59 and stato-rotor 60 being greater than the forward torque exerted on the sun gears 71a and 65 by the planet gearing 71 and 69. As a result the ring gear 76 is held stationary. If the drag on the driven shaft 2 decreases to such an extent that the reaction torque on the secondary turbine 59 becomes less than the forward torque exerted on the sun gear 71a, the secondary turbine will begin to rotate, thus adding another power flow path between the drive shaft 1 and driven shaft 2 through the secondary turbine 59, sleeve 62, gear carrier 68, planet gearing 69 and ring gear 76. If the drag on the driven shaft 2 decreases further to such an extent that the reaction torque on the stato-rotor 60 becomes less than the forward torque on the sun gear 65, the stato-rotor will begin to rotate and the entire turbo-torque converter will act as a coupler, the primary turbine 58, secondary turbine 59, and turbo-stator 60 eventually closely approaching the speed of the pump rotor 58.

If it is desired to effect an overdrive, the clutch 77 is operated to hold the sun gear 65 against rotation, thus effecting an overdrive to the ring gear 76, the one-way clutch 66 enabling the stato-rotor 60 to continue to rotate at approximately the speed of the pump rotor 57. With this construction, efficiency and torque curves substantially like that shown in Fig. 10 may be obtained, it being noted that high initial torque is obtained approximately ten times that of the drive shaft, and that the efficiency curve rises rapidly and stays at a relatively high point throughout the speed ratio range.

In Fig. 7 is shown a hydraulic coupler combined with a planetary having provisions for securing three efficient speed ratios. The construction shown comprises a drive shaft 1, a driven shaft 2, an intermediate shaft 3, a turbo-coupler comprising a pump rotor 78 connectible and disconnectible with respect to the drive shaft 1 by means of a clutch plate 79 splined on the sleeve 80, a turbine rotor 81 driven from the pump rotor 78 and keyed to the intermediate shaft 3, and a casing 82 surrounding the rotors having a one-way anchor 83 to prevent reverse rotation of the casing and a one-way clutch 84 to prevent the casing from over-running the clutch casing 85 secured to the drive shaft 1, and a clutch plate 86 splined on the sleeve 87 for connecting and disconnecting the casing 82 with respect to the clutch casing 85, a planetary construction comprising a sun gear 88 keyed to the intermediate shaft 3, a ring gear 89 secured to the coupler housing 82, planet gearing 90 meshing with the sun gear 88 and ring gear 89, a planet carrier 91 keyed to the driven shaft 2, planet gearing 96 mounted on the carrier 91, a sun gear 93 held against reverse rotation by a one-way anchor 94 engaging the sleeve 95 of the sun gear 93, the planet gearing 96 meshing with the sun gear 93 and ring gear 89, a brake 97 for holding the ring gear 89 against rotation when desired, and a brake 98 for holding the sun gear 93 against rotation when desired.

In this form with the car initially standing still, the drive will be a hydraulic coupler low gear from the drive shaft 1 through the clutch housing 85, clutch plate 79, pump sleeve 80, pump 78, turbine 81, intermediate shaft 3, sun gear 88, planet gearing 90 and cage 91 to the driven shaft 2, the ring gear 89 being held against reverse rotation by the one-way anchor 83.

For intermediate drive the clutch plate 79 is disconnected to eliminate the pump 78 and turbine 81 as a transmission device, and the clutch plate 86 is operated to connect the coupler housing 82 to rotate with the drive shaft 1.

Under these conditions the drive is from the drive shaft 1 through the clutch housing 85, clutch plate 86, sleeve 87, coupler housing 82, ring gear 89, planet gearing 90, and cage 91 to the driven shaft 2, the sun gear 93 being held against reverse rotation by the one-way anchor 94, the sun gear 88 and turbine 81 assuming whatever position they have to assume.

For substantially direct drive both clutch plates 79 and 86 are connected to the clutch housing 85.

In order to prevent excessive speed in going down hill or the like, the brakes 97 and 98 may be provided by means of which either the ring gear 89 or the sun gear 93 may be held against forward rotation as well as against reverse rotation.

The form shown in Fig. 8 comprises a drive shaft 1, a driven shaft 2, an intermediate shaft 3, a hydraulic coupler comprising a housing 99 keyed to the drive shaft 1, a pump rotor 100 mounted on a sleeve 101 and carrying a clutch plate 102 engageable and disengageable with respect to the housing 99, a turbine rotor 103 keyed to the intermediate shaft 3, a planetary gear construction similar to that of Fig. 7, comprising a sun gear 104 keyed to the intermediate shaft 3, a ring gear 105 carrying a clutch disc 106 engageable and disengageable with respect to the housing 99 of the hydraulic coupler, planet gearing 107 meshing with the sun gear 104 and ring gear 105, a planet carrier 108 on which the planets 107 are mounted keyed to the driven shaft 2, another set of planet gears 109 also mounted on the gear carrier 108, and meshing with the ring gear 105, a sun gear 110 meshing with the planet gearing 109, a one-way anchor 111 for preventing reverse rotation of the sun gear, a one-way anchor 112 for preventing reverse rotation of the ring gear 105, a brake 113 for holding the sun gear 110 against rotation, and a brake 114 for holding the ring gear 105 against rotation. A one-way clutch 114a may be provided to prevent the ring gear 105 from overrunning the housing 99 when the clutch disc 106 is disconnected.

In this form the operation is substantially like that of Fig. 7. With the car initially standing still, the clutch plate 102 will be placed in position to connect the pump 100 with the coupler casing 99, the clutch plate 106 will be in position to disconnect the ring gear 105 from the coupler casing, and the two brakes 113 and 114 will be free. Under these conditions the first drive will be a high torque drive from the drive shaft 1 through the coupler casing 99, pump rotor 100, turbine rotor 103, intermediate shaft 3, sun gear 104, planet gearing 107, and gear carrier 108 to the driven shaft 2, the ring gear 105 being held against reverse rotation by the one-way anchor 112.

For intermediate speed the clutch plate 102 is shifted to disconnect the pump rotor 100 and the clutch plate 106 is shifted to connect the ring gear 105 with the coupler casing 99. Under these conditions the drive is from the coupler casing 99, through the clutch 106, ring gear 105, planet gearing 107, and gear carrier 108 to the driven shaft 2, the sun gear 110 being held against reverse rotation by the one-way anchor 111. For direct drive both clutch plates 102 and 106 are connected to rotate with the coupler casing 99, the drive then being a divided power flow, one path being through the ring gear 105 and planet gearing 107 to the gear carrier 108, the other path being from the turbine rotor 103 through the sun gear 104 and planet gearing 107 to the gear carrier 108.

The construction of Fig. 9 comprises a drive shaft 1, a driven shaft 2, an intermediate shaft 3, a hydraulic coupler comprising a casing 115, a pump rotor 116 keyed to a sleeve 117 on which a clutch plate 118 is splined, engageable and disengageable with respect to the coupler housing 115, and a turbine rotor 119 driven from the pump rotor 116 and keyed to the intermediate shaft 3, planet gearing comprising a sun gear 120 keyed to the intermediate shaft 3, a ring gear 121 mounted on a sleeve 122, and having a clutch plate 123 splined thereon, engageable and disengageable with respect to the coupler casing 115, planet gearing 124 meshing with the sun gear 120 and ring gear 121, a gear carrier 125 upon which the planet gearing 124 is mounted keyed to the driven shaft 2, a sun gear 126 surrounding the driven shaft 2, provided with a one-way anchor 127 for preventing reverse rotation, and planet gearing 128 meshing with the sun gear and ring gear mounted on the gear carrier.

A one-way clutch 129 is provided for preventing reverse rotation of the ring gear 121. A brake 130 may be provided for holding the ring gear against rotation, if desired.

With this form, with the car initially standing still, low gear may be secured by connecting the pump rotor 116 to rotate with the coupler casing 115 and disconnecting the ring gear 121 from the coupler casing 115. Under these conditions the drive is from the pump rotor 116 through the turbine rotor 119, intermediate shaft 3, sun gear 120, planet gearing 124 and gear carrier 125 to the driven shaft 2, the ring gear 121 being held against reverse rotation by the one-way anchor 129. For intermediate speed the clutch plate 118 is freed from connection with the coupler casing 115 and the ring gear clutch plate 123 is connected with the coupler casing. Under these conditions the drive is from the clutch plate 123 through the ring gear 121, planet gearing 124, and gear carrier 125 to the driven shaft 2, the sun gear 126 being held against reverse rotation by the one-way anchor 127.

For direct drive both the ring gear and the pump rotor are connected to rotate with the coupler casing, the drive then being a divided power path, one path being from the ring gear 121 to the planet gearing 124, and the other path being from the pump rotor 116 through the turbine rotor 119, intermediate shaft 3, sun gear 120, planet gearing 124, and gear carrier 125 to the driven shaft 2.

The construction shown in Fig. 11 comprises a drive shaft 1, a driven shaft 2, an intermediate shaft 3, a hydraulic coupling comprising a pump rotor 131 keyed to the drive shaft 1, a turbine rotor 132 keyed to the intermediate shaft 3, a coupler housing 133 rotatable with the pump rotor, a sun gear 134 keyed to the intermediate shaft 3, a ring gear 135 surrounding the intermediate shaft, a two-way clutch 136 shiftable either to connect the ring gear 135 with the coupler housing 133 or to hold the ring gear against rotation by engagement with a fixed friction ring 137, planet gearing 138 meshing with the ring gear 135 and sun gear 134, a gear carrier 139 on which the planet gears 138 are mounted, a set of triple planets 140 rotatable with the gear carrier, a sun gear 141 rotatable with the driven shaft, a sun gear 142 meshing with a large diameter gear portion of the planet gears 140, a sleeve 143 rotatable with this sun gear, a two-way clutch 144 shiftable either to connect the sleeve with the driven shaft 2 or to hold the pinion 142 against rotation, a sun gear 144a meshing with the small diameter portion of the planet gears 140, a sleeve 145 rotatable with this sun gear, a brake drum 146 rotatable with this sleeve, and a brake band 147 for holding the brake drum 140 against rotation.

For the lowest speed the plates 148 and 149 are shifted to engage the stationary rings 137 and 15, respectively, to hold the gears 135 and 142, respectively, against rotation. The drive from the drive shaft 1 to the cage 139 will then be through the pump rotor 131, the turbine rotor 132, the sun gear 134, and planet gears 138. The drive from the cage 139 to the driven shaft 2 will be a reduced speed drive through the sun gear 141, the sun gear 142 which is held against rotation being of larger diameter than the sun gear 141.

For the next higher speed ratio the ring gear 135 will still be held against rotation but the clutch plate 149 will be shifted to grip the plate 152 and cause it to rotate with the casing 144, thus causing the sun gear 142 to rotate with the driven shaft 2. Under these conditions, the sun gear 142 will rotate with the sun gear 141 as a unit.

For the next higher speed the clutch plate 141 will be operated to hold the sun gear 142 against rotation as in the lowest speed ratio, and the clutch plate 148 will be operated to connect the ring gear 135 to rotate with the coupler housing 133 and drive shaft 1. Under these conditions the drive to the cage 139 from the drive shaft 1 will be a divided power flow, one path being through the coupler housing 133 and ring gear to the planets 138 and the other path being through the pump rotor 131, turbine rotor 132, intermediate shaft 3, ring gear 134 and planet gear 138.

For direct drive the ring gear 135 will remain connected with the coupler housing 133 and the clutch plate 149 will be shifted to connect the sun gear 142 to rotate with the driven shaft 2.

For reverse the clutch plate 149 is placed in neutral, clutch plate 148 is shifted to hold the ring gear 135 against rotation, and the brake 147 is applied to hold the sun gear 144 against rotation. Under these conditions, the power flow from the drive shaft 1 to the cage 139 will be as described in connection with the lowest gear. The sun gear 144 being held against rotation and being larger in diameter than the sun gear 141 will cause reverse rotation of the driven shaft 2.

The construction shown in Fig. 12 comprises a drive shaft 1, a driven shaft 2, an intermediate shaft 3, a gear carrier 153 keyed to the drive shaft 1, a sun gear 154 keyed to the intermediate shaft 3, a ring gear 155 rotatable on the intermediate shaft 3, planet gears 156 meshing with the sun gear 154 and ring gear 155 and carried by the gear carrier 153, a pump rotor 157 rotatable with the ring gear, a turbine rotor 158 rotatable with a sleeve 159 keyed to the intermediate shaft 3, a stato-rotor 160 providing a reactance between the pump rotor and turbine rotor, a gear carrier 161 rotatable with the sleeve 159 of the turbine rotor, planet gears 162 mounted on this gear carrier 161, a sun gear 163 meshing with the planet gears 162, a one-way clutch 164 for holding the sun gear 163 against reverse rotation, a one-way clutch 165 for preventing the sun gear 163 from overrunning the stato-rotor 160, a one-way clutch 166 for preventing the stato-rotor from overrunning the turbine rotor 158, a manually operable holding device 167 for holding the sun gear against rotation when desired for overdrive, a ring gear 168 meshing with the planet gears 162 and keyed to the intermediate shaft 163 and rotatable with a cage 169.

The triple gears 140, sun gears 141, 142 and 144, sleeves 143 and 145, brake members 146 and 147, and clutch members 149, 151 and 152 may be the same as those of Fig. 11.

For lowest speed ratio the clutch plate 149 will be shifted to hold the sun gear 142 against rotation. The drive from the drive shaft 1 to the cage 169 will be a divided path power flow. One path will be from the drive shaft 1 through the cage 153, planet gears 156, ring gear 155, pump rotor 157, stator 160, turbine rotor 158, sleeve 159, cage 161, planet gears 162 and ring gear 168. The other path will be from the drive shaft 1 through cage 153, planet gears 156, sun gear 154, intermediate shaft 3, cage 161 and planet gears 162. The drives from the cage 169 to the driven shaft 2 will be just as described in connection with the low speed ratio, direct drive, and reverse of Fig. 11.

Referring again to the front end of the transmission, the sun gear 163 is connected by means of the one-way clutch 165 to the stator 160 so that the force acting on the sun gear 163 tends to cause the stator 160 to rotate in the direction of the pump rotor 157. This results in early release of the sun gear 163 and stator 160 from the one-way anchor 164, causing the converter to act as a coupler at a more efficient point in its stage of operation than would otherwise be the case. The fact that part of the power to the cage 169 is supplied through a by-pass path including the sun gear 154 and intermediate shaft 3 increases the efficiency of the transmission over one in which all of the power is transmitted through the hydraulic converter.

The construction shown in Fig. 13 is similar to that shown in Fig. 11 except that in Fig. 13 the sun gear is connectible and disconnectible with respect to the motor drive shaft while the ring gear is secured to the intermediate shaft to which the turbine rotor is connected. The clutch members 136, 137, 148 and 150, the clutch members 144, 149, 151, and 152, the brake members 146, and 147, and the triple planets 140 and the sun gears 141, 142, and 144 may be the same as in Fig. 11. The operation of this form will be clear from the description of Fig. 11.

In Fig. 14, the drive shaft 1, the driven shaft 2, the intermediate shaft 3, the pump rotor 4, the turbine rotor 5, the stato-rotor 7, the one-way clutch 18a, the clutch members 15 and 16 and the clutch control members 17 and 18 may be the same as those shown in Fig. 1. The gearing comprises a sun gear 170 secured to rotate with the intermediate shaft 3, a ring gear 171 secured to rotate with the turbine rotor 5, a planet gear carrier 172 connectible and disconnectible with respect to the driven shaft 2, planet gears 173 carried by the gear carrier 172 and meshing with the sun gear 170 and ring gear portion 174 and duplex planet gears 175 also carried by the gear carrier 172. Each duplex planet 175 comprises a portion meshing with the ring gear portion 176 and with a sun gear 177 surrounding the driven shaft and a gear portion meshing with another sun gear 178 surrounding the driven shaft 2 and connectible and disconnectible with respect to the driven shaft by axial movement of the driven shaft. A one-way anchor 179 is provided to prevent reverse rotation of the sun gear 177.

A clutch-shifting ring 180 is shiftable from the position shown in which it engages only a clutch portion on the sun gear 177 to a position in which it engages a fixed anchorage ring 181 surrounding the driven shaft 2. This clutch-shifting ring 180 is swiveled on a collar 182 secured to the driven shaft 2 so that when the clutch ring 180 is shifted, the driven shaft 2 also will be shifted to change the connection of the driven shaft 2 from the gear carrier 172 to the sun gear 178.

In this construction, when the clutch 15 is disconnected, the sun gear 177 will be held against reverse rotation by the one-way anchorage member 179 and the drive will be from the drive shaft 1 through the clutch casing, the pump rotor 4, stato-rotor 7, turbine rotor 5, ring gear 176, and planet gear 175 to the cage 172 which drives the driven shaft 2. When the clutch 15 is operated to cause the sun gear 170 to rotate with the drive shaft 1, the sun gear 170 acts as an efficiency booster by-pass power flow, the power flow then being divided between the flow through the hydraulic torque converter to the ring gear 174 and the flow trough the intermediate shaft 3 to the sun gear 170. For reverse, the clutch ring 180 is shifted to the left to hold the sun gear 177 against rotation and to connect the driven shaft 2 with the sun gear 178. As the sun gear 178 is smaller than the sun gear 177, the driven shaft 2 will be driven in a direction reverse to that of the cage 172 which is driven either by the ring gear portion 176 alone or by the ring gear portion 174 in combination with the sun gear 170.

The construction shown in Fig. 15 comprises a drive shaft 1, a driven shaft 2, an intermediate shaft 3, a pump rotor 4 secured to a clutch casing 183 rotatable with the drive shaft 1, a one-way stator 7, a turbine rotor 5, a clutch casing 184 secured to the turbine rotor, a one-way anchor 185 for preventing reverse rotation of the stator, a clutch 15 by means of which the intermediate shaft 3 can be connected or disconnected with respect to the drive shaft 1, a sun gear 186 secured to the intermediate shaft 3, a gear carrier 187 secured to rotate with the driven shaft 2, planet gearing 188 mounted on the gear carrier 187 and meshing with the sun gear 186, a sun gear 189 surrounding the driven shaft 2, a one-way anchor 190 preventing reverse rotation of the sun gear 189, planet gearing 191 carried by the gear carrier 187 and meshing with the sun gear 189, a ring gear 192 meshing with both sets of planet gearing 188 and 191, a one-way anchor 192a for preventing reverse rotation of the ring gear, a clutch plate 193 for connecting and disconnecting the sun gear 186 with respect to the turbine rotor 5, a clutch plate 194 for connecting and disconnecting the ring gear 192 with respect to the turbine rotor 5, a brake 195 for holding the ring gear 192 against rotation, and a centrifugal clutch 196 for connecting and disconnecting the turbine rotor 5 with respect to the clutch casing 183.

This construction enables a very high torque ratio of about 12:1 to be obtained, by connecting the sun gear 186 to rotate with the turbine rotor 5, leaving the other clutches and the brake 195 disconnected. With the parts in this position, a torque ratio range from about 12:1 to about 3:1 may be obtained. For a lower torque ratio range, the sun gear 186 is disconnected from the turbine rotor and the ring gear 192 is connected to the turbine rotor. With the parts in this position, a torque ratio range from about 6:1 to 1.5:1 may be obtained. If it is desired to use the by-pass efficiency booster, the sun gear 186 is connected by means of the clutch plate 15 to rotate with the drive shaft 1. With the parts in this position, a torque ratio range from about 2:1 to direct may be obtained. If it is desired to eliminate the hydraulic torque converter action entirely, the centrifugal clutch 196 may be so controlled as to connect the turbine rotor 5 with the clutch casing 183. It will be noted that in this form, as in some of the other forms, the one-way anchors 190 and 192a will prevent the car from slipping back in going up an incline when the motor is allowed to idle. It will also be noted that the clutches may all be disconnected from driving relation so that there will be no drag tending to make the car creep.

When the sun gear 186 is connected by means of the clutch 193 to rotate with the turbine rotor 5 and the other clutches and the brake 195 are disconnected, the power flow is from the drive shaft 1 through the clutch casing 183, pump rotor 4, stator 7, turbine rotor 5, clutch 193, sun gear 186 and planet gearing 188 to the gear carrier 187, the ring gear 192 being held against reverse rotation by the one-way anchor 192a. This gives the highest torque ratio range. When the sun gear 186 is disconnected from the turbine rotor and the ring gear 192 is connected to the turbine rotor 5 by means of the clutch plate 194, power flow is from the drive shaft 1, through the torque converter to the ring gear 192, the sun gear 189 being held against reverse rotation by the one-way anchor 190. When both the sun gear 186 and the ring gear 192 are connected to rotate in unison with the turbine rotor 5, by the clutch plates 193 and 194, the planetary construction and driven shaft 2 rotate as a unit with the turbine rotor 5.

If the by-pass efficiency booster is used, the power flow is divided, one part going through the fluid torque converter to the ring gear 192 and the other part going from the drive shaft through the clutch 15 and intermediate shaft 3 to the sun gear 186 while the sun gear 189 idles. When the ring gear is not connected with the clutch 194, the brake 195 may be used to prevent free-wheeling of the ring gear.

In the construction of Fig. 16 a transformer efficiency booster is provided and also a by-pass power flow efficiency booster. This construction comprises a drive shaft 1, a driven shaft 2, a pump rotor 4, a stato-rotor 7, a one-way anchor 196 for holding the stato-rotor against reverse rotation, a turbine rotor 5 secured to the driven shaft 2, a duplex ring gear 197 rotatable with the pump rotor 4, a gear carrier 198 rotatable with the drive shaft 1, planet gearing 199 mounted on the gear carrier and meshing with the ring gear, a sun gear 200 rotatable on the drive shaft and meshing with the planet gearing 199, a one-way clutch 201 for holding the sun gear 200 against over-running the drive shaft 1, a power transmitting disc 202 rotatable with the sun gear 200, a power-transmitting housing 203 connectible and disconnectible with respect to the power-transmitting disc 202 by means of a clutch 204, a one-way clutch 205 to prevent the power-transmitting housing 203 from overrunning the stato-rotor 7, a brake 206 for holding the disc 202 against rotation, planet gearing 207 mounted on the gear carrier 198 and meshing with the ring gear 197, a sun gear 208 surrounding the driven shaft 2 and meshing with the planet gearing 207, and a one-way clutch 209 for preventing the sun gear 208 from overrunning the driven shaft 2.

For by-pass efficiency operation, the clutch 204 and the brake 206 are placed in inoperative position. Under these conditions there will be a two-path power flow between the drive shaft 1 and the driven shaft 2. One path will be from the drive shaft 1, through the gear carrier 198, planetary gearing 207, sun gear 208, and one-way clutch 209 to the driven shaft 2. The other path will be from the drive shaft 1, through the gear carrier 198, planet gearing 207, ring gear 197, pump rotor 4, stato-rotor 7, and turbine rotor 5 to the driven shaft 2. This will give an overall maximum torque ratio of about 1:3.5. As a large proportion of the power flows through the efficient sun gear 208, there will be a material increase in efficiency over an all-fluid drive.

For transformer efficiency, the brake 206 is still held in off-condition, but the clutch 204 is applied to connect the housing 203 with the disc 202. Under these conditions, the sun gear 200 will be held against forward rotation by fluid reaction on the stato-rotor 7 acting through the one-way clutch 205, power transmitting housing 203 and disc 202. When the fluid reaction on the stato-rotor 7 becomes less than the force exerted on the sun gear 200 by the planet gearing 202, the sun gear 200 will begin to rotate and the fluid transmission will thereafter act as a coupler, not as a converter. Due to this advanced transformation from converter to coupler, the change will take place at a more efficient point on the efficiency curve of the converter than would be the case without the advanced transformation.

For overdrive, the brake 206 is applied and the clutch 204 may be either connected or disconnected. Under these conditions, the sun gear 200 is held stationary and the pump rotor 4 has an overdrive with respect to the drive shaft 1, it being assumed that this overdrive will be used only when the drag on the driven shaft 2 is so small that the fluid drive will act as a coupler, not as a converter.

Further modifications will be apparent to those skilled in the art and it is desired, therefore, that the invention be limited only by the scope of the appended claims.

Having thus described my invention, what I claim and desire to secure by Letters Patent is:

1. A hydraulic planetary transmission comprising a pump rotor, a turbine rotor, a gear carrier, planet gearing carried by said gear carrier, a unitary ring gear member meshing with said planet gearing, two sun gears, each meshing with said planet gearing and in force exerting relation with respect to said unitary ring gear member, means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and means for holding said ring gear member against reverse rotation with respect to the direction of rotation of said drive rotor when disconnected with respect to said drive rotor.

2. A hydraulic planetary transmission comprising a pump rotor, a turbine rotor, a gear carrier, planet gearing carried by said gear carrier, a unitary ring gear member meshing with said planet gearing, two sun gears, each meshing with said planet gearing and in force exerting relation with respect to said unitary ring gear member, one-way anchorage means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and means for holding said ring gear member against reverse rotation with respect to the direction of rotation of said drive rotor when disconnected with respect to said drive rotor.

3. A hydraulic planetary transmission comprising a pump rotor, a turbine rotor, a gear carrier, planet gearing carried by said gear carrier, a unitary ring gear member meshing with said planet gearing, two sun gears, each meshing with said planet gearing and in force exerting relation with respect to said unitary ring gear member, means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and one-way anchorage means for holding said ring gear member against reverse rotation with respect to the direction of rotation of said drive rotor when disconnected with respect to said drive rotor.

4. A hydraulic planetary transmission comprising a pump rotor, a turbine rotor, a gear carrier, planet gearing carried by said gear carrier, a unitary ring gear member meshing with said planet gearing, two sun gears, each meshing with said planet gearing and in force exerting relation with respect to said unitary ring gear member, one-way anchorage means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and one-way anchorage means for holding said ring gear member against reverse rotation with respect to the direction of rotation of said drive rotor when disconnected with respect to said drive rotor.

5. A hydraulic planetary transmission comprising a pump rotor, a turbine rotor, a gear carrier, planet gearing carried by said gear carrier, a first gear member meshing with said planet gearing, two second gears each meshing with said planet gearing and in force exerting relation with respect to said first gear member, means for holding one of said two second gears against reverse rotation with respect to the direction of rotation of the turbine rotor, a drive rotor, means for connecting the other of said two second gears to rotate in unison with the turbine rotor, means for connecting said drive rotor in force transmitting relation to said pump rotor, means for connecting and disconnecting said drive rotor with respect to force transmitting relation to said first gear member, and means for holding said first gear member against reverse rotation with respect to the direction of rotation of said drive rotor when disconnected with respect to said drive rotor.

6. A hydraulic planetary transmission comprising a pump rotor, a turbine rotor, a stator acting between said pump rotor and turbine rotor, a gear carrier, planet gearing carried by said gear carrier, a first gear member meshing with said planet gearing, two second gears each meshing with said planet gearing and in force exerting relation with respect to said first gear member, means for holding one of said two second gears against reverse rotation with respect to the direction of rotation of the turbine rotor, a drive rotor, means for connecting the other of said two second gears to rotate in unison with the turbine rotor, means for connecting said drive rotor in force transmitting relation to said pump rotor, means for connecting and disconnecting said drive rotor with respect to force transmitting relation to said first gear member, and means for holding said first gear member against reverse rotation with respect to the direction of rotation of said drive rotor when disconnected with respect to said drive rotor.

7. A hydraulic planetary transmission comprising a pump rotor, a turbine rotor, a stator acting between said pump rotor and turbine rotor, a gear carrier, planet gearing carried by said gear carrier, a unitary ring gear member meshing with said planet gearing, two sun gears, each meshing with said planet gearing and in force exerting relation with respect to said unitary ring gear member, means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and means for holding said ring gear member against reverse rotation with respect to the direction of rotation of said drive rotor when disconnected with respect to said drive rotor.

8. A hydraulic planetary transmission comprising a pump rotor, a turbine rotor, a stator acting between said pump rotor and turbine rotor, a gear carrier, planet gearing carried by said gear carrier, a unitary ring gear member meshing with said planet gearing, two sun gears, each meshing with said planet gearing and in force exerting relation with respect to said unitary ring gear member, one-way anchorage means for holding one of said sun gears against reverse rotation with respect to the direction of rotation of the turbine rotor, means for connecting the other sun gear to rotate in unison with the turbine rotor, a drive rotor, means for connecting said drive rotor in force transmitting relation to said pump rotor, means for connecting and disconnecting said drive rotor with respect to force transmitting relation to said ring gear member, and one-way anchorage means for holding said ring gear member against reverse rotation with respect to the direction of rotation of said drive rotor when disconnected with respect to said drive rotor.

9. A hydraulic planetary transmission comprising a pump rotor, a turbine rotor, a stator acting between said pump rotor and turbine rotor, a gear carrier, planet gearing carried by said gear carrier, a first gear member meshing with said planet gearing, two second gears each meshing with said planet gearing and in force exerting relation with respect to said first gear member, means for holding one of said two second gears against reverse rotation with respect to the direction of rotation of the turbine rotor, a drive rotor, selective means for connecting the other of said two second gears to rotate in unison either with said drive rotor or with the turbine rotor, means for connecting said drive rotor in force transmitting relation to said pump rotor, means for connecting and disconnecting said drive rotor with respect to force transmitting relation to said first gear member, and means for holding said first gear member against reverse rotation with respect to the direction of rotation of said drive rotor when disconnected with respect to said drive rotor.

10. A variable speed transmission comprising a hydraulic transmission and planetary gear transmission, said hydraulic transmission comprising a driving vaned rotor and a driven vaned rotor coaxial therewith, said planetary transmission comprising two sun gears, a unitary ring gear member, a gear carrier, and planetary gearing mounted on said carrier and meshing with said ring gear member and both sun gears, a drive rotary member, a driven rotary member, said gear carrier being connected to rotate in unison with said driven rotary member, means for holding one of said sun gears against reverse rotation with respect to said drive rotary member, means for holding said unitary ring gear against reverse rotation with respect to said drive rotary member, and selective means for connecting either said other sun gear or said unitary ring gear member, or both, in force transmission relation with respect to said drive rotary member to provide three different selectible power flow paths, at least one of said paths including said vaned rotors.

11. A variable speed transmission comprising a hydraulic torque converter and a planetary gear construction, said converter comprising a pump rotor, a turbine rotor and a stator, said planetary gear construction comprising a gear carrier, planet gearing carried by said gear carrier, a sun gear meshing with said planet gearing and a ring gear meshing with said planet gearing, a drive shaft for rotating the pump rotor, a driven shaft connected to rotate in unison with said gear carrier, means connecting one of said gears to rotate in unison with said turbine rotor, a one-way anchor for preventing reverse rotation of the other gear with respect to said turbine rotor, clutch means for connecting and disconnecting said other gear with respect to said turbine rotor to cause said other gear either to rotate in unison with the turbine rotor or to release said other gear to leave it free to be anchored by said one-way anchor, and clutch means for connecting said driven shaft to rotate in unison with said drive shaft.

12. A variable speed transmission comprising a hydraulic torque converter and a planetary gear construction, said converter comprising a pump rotor, a turbine rotor and a stator, said planetary gear construction comprising a gear carrier, planet gearing carried by said gear carrier, a sun gear meshing with said planet gearing and a ring gear meshing with said planet gearing, a drive shaft for rotating the pump rotor, a driven shaft connected to rotate in unison with said gear carrier, means connecting said sun gear to rotate in unison with said turbine rotor, a one-way anchor for preventing reverse rotation of said ring gear with respect to said turbine rotor, clutch means for connecting and disconnecting said ring gear with respect to said turbine rotor to cause said ring gear either to rotate in unison with the turbine rotor or to release the ring gear to leave it free to be anchored by said one-way anchor, and clutch means for connecting said driven shaft to rotate in unison with said drive shaft.

13. A variable speed transmission comprising a hydraulic torque converter and a planetary gear construction, said converter comprising a pump rotor, a turbine rotor and a stator, said planetary gear construction comprising a gear carrier, planet gearing carried by said gear carrier, a sun gear meshing with said planet gearing and a ring gear meshing with said planet gearing, a drive shaft for rotating the pump rotor, a driven shaft connected to rotate in unison with said gear carrier, means connecting said sun gear to rotate in unison with said turbine rotor, a one-way anchor for preventing reverse rotation of said ring gear with respect to said turbine rotor, clutch means comprising a gripping rotor connected to rotate in unison with said ring gear, and a gripping rotor connected to rotate in unison with said turbine rotor for connecting and disconnecting said ring gear with respect to said turbine rotor to cause said ring gear either to rotate in unison with the turbine rotor or to release the ring gear to leave it free to be anchored by said one-way anchor, and clutch means for connecting said driven shaft to rotate in unison with said drive shaft.

14. A variable speed transmission comprising a hydraulic torque converter and a planetary gear construction, said converter comprising a pump rotor, a turbine rotor and a stator, said planetary gear construction comprising a gear carrier, planet gearing carried by said gear carrier, a sun gear meshing with said planet gearing and a ring gear meshing with said planet gearing, a drive shaft for rotating the pump rotor, a driven shaft connected to rotate in unison with said gear carrier, clutch instrumentalities for alternatively connecting one of said gears either to rotate in unison with said turbine rotor or with said drive shaft, a one-way anchor for preventing reverse rotation of the other gear with respect to said turbine rotor, and clutch means for connecting and disconnecting said other gear with respect to said turbine rotor to cause said other gear either to rotate in unison with the turbine rotor or to release said other gear to leave it free to be anchored by said one-way anchor.

15. A variable speed transmission comprising a hydraulic torque converter and a planetary gear construction, said converter comprising a pump rotor, a turbine rotor and a stator, said planetary gear construction comprising a gear carrier, planet gearing carried by said gear carrier, a sun gear meshing with said planet gearing and a ring gear meshing with said planet gearing, a drive shaft for rotating the pump rotor, a driven shaft connected to rotate in unison with said gear carrier, clutch instrumentalities for alternatively connecting said sun gear either to rotate in unison with said turbine rotor or with said drive shaft, a one-way anchor for preventing reverse rotation of said ring gear with respect to said turbine rotor, and clutch means for connecting and disconnecting said ring gear with respect to said turbine rotor to cause said ring gear either to rotate in unison with the turbine rotor or to release the ring gear to leave it free to be anchored by said one-way anchor.

WILLARD L. POLLARD.